United States Patent
Janssen et al.

(10) Patent No.: US 8,883,277 B2
(45) Date of Patent: Nov. 11, 2014

(54) MULTIPLE GLAZING UNIT INCORPORATING AT LEAST ONE ANTIREFLECTION FILM AND USE OF AN ANTIREFLECTION FILM IN A MULTIPLE GLAZING UNIT

(75) Inventors: David Janssen, Toenisvorst (DE); Marcus Neander, Eschweiler (DE); Vincent Reymond, Antony (FR); Ulrich Billert, La Celle St Cloud (FR)

(73) Assignee: Saint-Gobain Glass France, Courbevoie (FR)

( * ) Notice: Subject to any disclaimer, the term of this patent is extended or adjusted under 35 U.S.C. 154(b) by 869 days.

(21) Appl. No.: 13/124,791

(22) PCT Filed: Oct. 16, 2009

(86) PCT No.: PCT/FR2009/051982
§ 371 (c)(1),
(2), (4) Date: Jul. 8, 2011

(87) PCT Pub. No.: WO2010/043828
PCT Pub. Date: Apr. 22, 2010

(65) Prior Publication Data
US 2011/0262694 A1 Oct. 27, 2011

(30) Foreign Application Priority Data
Oct. 17, 2008 (FR) .................................. 08 57085

(51) Int. Cl.
*E06B 3/00* (2006.01)
*C03C 17/34* (2006.01)
*E06B 3/67* (2006.01)

(52) U.S. Cl.
CPC ........... *E06B 3/6715* (2013.01); *C03C 17/3435* (2013.01); *C03C 2217/734* (2013.01)
USPC ....... 428/34; 52/786.1; 52/786.11; 52/786.13

(58) Field of Classification Search
USPC .................. 428/34; 52/786.1, 786.11, 786.13
See application file for complete search history.

(56) References Cited

U.S. PATENT DOCUMENTS 5,128,181 A * 7/1992 Kunert ............................ 428/34
5,156,894 A * 10/1992 Hood et al. ...................... 428/34
(Continued)

FOREIGN PATENT DOCUMENTS

| CA | 965 826 | 4/1975 |
| DE | 102 58 377 | 6/2004 |

OTHER PUBLICATIONS

International Search Report issued Feb. 19, 2010 in PCT/FR09/051982 filed Oct. 16, 2009.
U.S. Appl. No. 13/141,460, filed Jun. 22, 2011, Reymond, et al.
(Continued)

*Primary Examiner* — Donald J Loney
(74) *Attorney, Agent, or Firm* — Oblon, Spivak, McClelland, Maier & Neustadt, L.L.P.

(57) ABSTRACT

A multiple glazing unit with at least three substrates which are held together by a frame structure, in which at least two intermediate gas-filled cavities lie each between two substrates, at least one substrate has, on at least one face in contact with an intermediate gas-filled cavity, an antireflection film which is in a face-to-face relationship relative to said intermediate gas-filled cavity, with an insulating film having reflection properties for infrared and/or in solar radiation.

19 Claims, 3 Drawing Sheets

(56) References Cited

U.S. PATENT DOCUMENTS 6,344,288 B1 * 2/2002 Oyama et al. ............... 428/701
6,632,491 B1 10/2003 Thomsen et al.

2008/0178743 A1 7/2008 Hug et al.

OTHER PUBLICATIONS

U.S. Appl. No. 13/141,462, field Jun. 22, 2011, Reymond, et al.

* cited by examiner

MULTIPLE GLAZING UNIT INCORPORATING AT LEAST ONE ANTIREFLECTION FILM AND USE OF AN ANTIREFLECTION FILM IN A MULTIPLE GLAZING UNIT

CROSS-REFERENCE TO RELATED APPLICATIONS

This application is a National Stage entry under 35 USC 371 of PCT/FR09/51982, filed on Oct. 16, 2009, and claims priority to French Patent Application No. 08 57085, filed on Oct. 17, 2008.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF THE MATERIAL ON THE COMPACT DISC

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to a multiple glazing unit comprising, within the context of the invention, at least three substrates, of the glass substrate type, which are held together by a frame structure, in which at least two intermediate gas-filled cavities each lie between two substrates.

The invention relates more particularly to a triple glazing unit comprising three substrates that are held together by a frame structure, in which two intermediate gas-filled cavities each lie between two substrates.

The invention also relates to the use of substrates for manufacturing thermal-insulation and/or solar-protection multiple glazing units.

These multiple glazing units may equally well be intended for fitting into buildings and into vehicles, especially with a view to reducing air-conditioning load and/or preventing excessive overheating (the glazing is then called "solar control" glazing) and/or reducing the amount of energy dissipated to the outside (the glazing is said to be "low-E" or "low-emissivity" glazing) brought about by the ever increasing use of glazed surfaces in buildings and vehicle passenger compartments.

These glazing units may also be integrated into glazing having particular functionalities, such as for example heating glazing or electrochromic glazing.

2. Description of Related Art

One type of thin-layers stack known for giving substrates such thermal-insulation and/or solar-protection properties consists of a functional metallic layer having reflection properties in the infrared and/or in solar radiation, especially a metallic functional layer based on silver or on a silver-containing metal alloy.

In this type of thin-layers stack, the functional layer thus lies between two dielectric films each comprising in general several layers that are each made of a dielectric material of the nitride type, and especially silicon nitride or aluminum nitride or of the oxide type. From the optical standpoint, the purpose of these films that flank the metallic functional layer is to "antireflect" this metallic functional layer.

However, a blocker film is sometimes inserted between a or each dielectric film and the metallic functional layer, the blocker film placed beneath the functional layer, facing the substrate, protects said functional layer during an optional high-temperature heat treatment of the bending and/or tempering type, and the blocker film placed on the functional layer on the opposite side from the substrate protects this layer from any degradation during the deposition of the upper dielectric film and during an optional high-temperature heat treatment of the bending and/or tempering type.

Currently, there are low-E thin-film thin-layers stacks having a single functional layer (denoted hereafter by the expression "functional-monolayer coating") based on silver, having, when they are mounted in a conventional double glazing unit, consisting of two 4 mm glass sheets separated by a gas-filled cavity comprising 90% argon and 10% air, with a thickness of 16 mm, one of the sheets of which is coated with the functional-monolayer coating, namely the sheet furthest to the inside of the building when considering the incident direction of the solar light entering the building, on its face turned toward the gas-filled cavity (4-16/(Ar-90%)-4 configuration in which the functional-monolayer coating is the inner face called "face 3"):

a light transmission in the visible $T_L$ of around 75 to 80%, or even higher;
a light reflection in the visible $R_L$ of around 20 to 10%, or less;
a solar factor (also called a "g-value") of at least 0.6 and around 0.63 to 0.68, or higher; and
a heat transfer coefficient (also called a "U-value") equal to or less than 1.5 and around 1.2 to 1.1, or even slightly less.

In a triple glazing structure the substrate bearing the insulating film may be on face 2 and/or on face 3 and/or on face 5 when considering the incident direction of the solar light passing through the faces in increasing order of their number, starting with the outermost face which is denoted by the number 1.

However, by integrating this (or these) insulating film (or films), although effectively improving the thermal insulation by reducing the heat transfer coefficient, there is also a reduction in the light transmission in the visible and a reduction in the g-value.

Thus, the multiple glazing unit appears to be less transparent in the visible than the double glazing unit such as the one presented above, and the energy saving inside the housing through solar radiation is less.

BRIEF SUMMARY OF THE INVENTION

The object of the invention is to succeed in remedying the drawbacks of the prior art, by developing a novel type of multiple glazing unit that has a high light transmission and a high g-value, at the very least a light transmission and a g-value that are similar to those of a double glazing unit with enhanced thermal insulation.

BRIEF DESCRIPTION OF THE SEVERAL VIEWS OF THE DRAWINGS

The details and advantageous features of the invention will become apparent from the following nonlimiting examples, illustrated by means of the following appended figures.

DETAILED DESCRIPTION OF THE INVENTION

Figure 1:
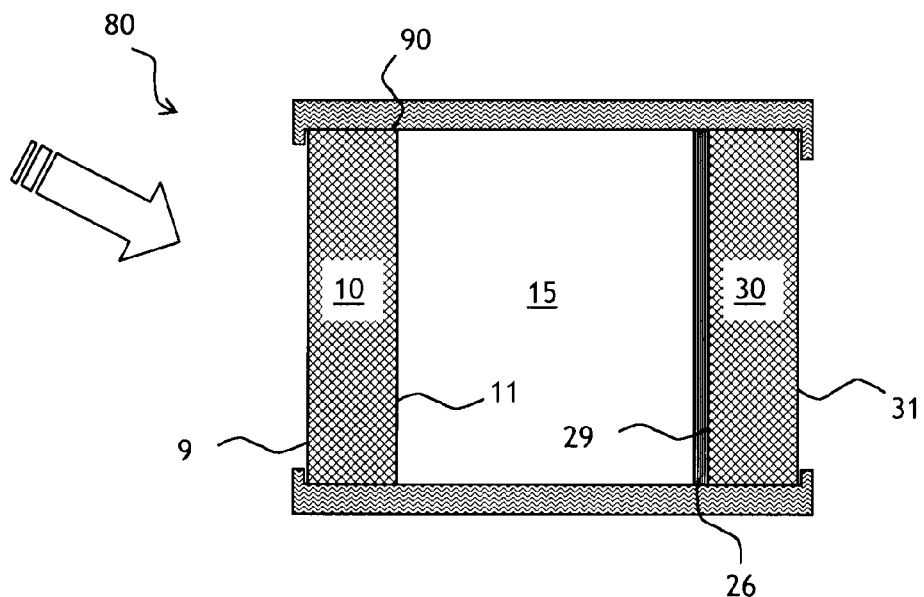
FIG. 1 illustrates a cross-sectional view of a double glazing unit of the prior art according to Example 1.

One subject of the invention, in its widest accepted sense, is a multiple glazing unit. This glazing unit comprises at least three substrates which are held together by a frame structure, in which at least two intermediate gas-filled cavities lie each between two substrates, at least one substrate having, on at least one face in contact with an intermediate gas-filled cavity, an antireflection film which is in a face-to-face relationship, relative to said intermediate gas-filled cavity, with an insulating film having reflection properties in the infrared and/or in solar radiation.

The term "antireflection film" should be understood to mean any optical interference element or system having a precise refractive index or an average refractive index which lies between that of glass (index n about 1.5) and that of air (index n about 1).

The optical indices (also called "refractive indices") mentioned here in the present document are those measured as is usually the case, at a wavelength of 550 nm.

Preferably, a central substrate, the two faces of which are each in contact with an intermediate gas-filled cavity, has an antireflection film on at least one face in contact with an intermediate gas-filled cavity and preferably on both its faces.

Preferably, in a face-to-face relationship relative to all the intermediate gas-filled cavities one face of one substrate has an antireflection film and the other face of the other substrate has an insulating film having reflection properties in the infrared and/or in solar radiation.

In one variant, said insulating film comprises an active system of the electrochromic system type and in another variant said insulating film comprises a low-E or solar-control thin-layers stack, this thin-layers stack comprising at least one functional layer having reflection properties in the infrared and/or in solar radiation, especially at least one metallic functional layer, in particular based on silver or on a silver-containing metal alloy.

Within the context of the preceding variant, said thin-layers stack preferably comprises at least one metallic functional layer, based on silver or on a silver-containing metal alloy, and two dielectric films, said films each comprising at least one dielectric layer, said functional layer being placed between the two dielectric films, the functional layer being optionally deposited directly on an underblocker film placed between the functional layer and the dielectric film subjacent to the functional layer, and the functional layer being optionally deposited directly beneath an overblocker film placed between the functional layer and the dielectric film superjacent to the functional layer.

It is also possible to use a thin-layers stack that comprises a single metallic functional layer based on silver or on a silver-containing metal alloy, the optical thickness of the dielectric film subjacent to the functional layer (i.e. positioned between the substrate bearing the thin-layers stack and the functional layer) then preferably being greater than the optical thickness of the dielectric film superjacent to the functional layer, the ratio of the optical thickness of the subjacent dielectric film to the optical thickness of the superjacent dielectric film being between 1.05 and 1.4, including these values, and optionally between 1.08 and 1.3, including these values.

It is also possible, independently of or in addition to the above solution, to use a thin-layers stack that comprises a single metallic functional layer based on silver or on a silver-containing metal alloy, said dielectric film subjacent to the functional layer preferably comprising a highly refringent dielectric layer, this highly refringent layer having an optical index greater than 2.2, preferably between 2.3 and 2.8 including these values, and optionally between 2.4 and 2.7 including these values.

The present invention also relates to the use of an antireflection film. Thus, an antireflection film is used on at least one face of at least one substrate for producing a multiple glazing unit according to the invention, comprising at least three substrates which are held together by a frame structure, in which multiple glazing unit at least two intermediate gas-filled cavities lie each between two substrates, said antireflection film being in contact with an intermediate gas-filled cavity and being in a face-to-face relationship, relative to said intermediate gas-filled cavity, with an insulating film having reflection properties in the infrared and/or in solar radiation.

Within the context of this use, preferably the face(s) having said antireflection film is (are) the face(s) of the central substrate of the multiple glazing unit, said faces each being in contact with an intermediate gas-filled cavity.

Preferably, in a face-to-face relationship, relative to all the intermediate gas-filled cavities, one face of one substrate has an antireflection film and the other face of the other substrate has an insulating film having reflection properties in the infrared and/or in solar radiation.

In one variant of the use, said insulating film comprises at least one active system of the electrochromic system type and, in another variant of the use, said insulating film comprises a low-E or solar-control thin-layers stack, this thin-layers stack comprising at least one functional layer having reflection properties in the infrared and/or in solar radiation, especially at least one metallic functional layer, in particular based on silver or on a silver-containing metal alloy.

Within the context of the above variant too, preferably said thin-layers stack comprises at least one metallic functional layer, based on silver or on a silver-containing metal alloy, and two dielectric films, said films each comprising at least one dielectric layer, said functional layer being placed between the two dielectric films, the functional layer being optionally deposited directly on an underblocker film placed between the functional layer and the dielectric film subjacent to the functional layer, and the functional layer being optionally deposited directly beneath an overblocker film placed between the functional layer and the dielectric film superjacent to the functional layer.

This functional-monolayer coating when it is a low-E coating, has a low sheet resistance (and therefore a low emissivity), a high light transmission and a relatively neutral color, in particular in reflection on the thin-layers stack side (but also on the opposite side, called the "substrate side") and these properties are preferably maintained within a restricted range whether or not the thin-layers stack undergoes one or more high-temperature heat treatments of the bending and/or tempering and/or annealing type.

The dielectric layer which at the least lies within each dielectric film, as defined above, has an optical index between 1.6 and 2.8 including these values, or preferably between 1.9 and 2.2 including these values except in the case of a highly refringent dielectric layer.

The low-E thin-layers stack according to the invention is such that the sheet resistance R in ohms per square of the functional layer (which is directly associated with the emissivity) is less than 10 ohms/□ and of the order of about 5 to 3 ohms/□.

In one particular variant, at least one dielectric film—the subjacent dielectric film and/or the superjacent dielectric film—comprises at least one dielectric layer based on silicon nitride, optionally doped with at least one other element, such as aluminum.

In one particular variant, the overcoat for the subjacent dielectric film, the one furthest away from the substrate, is a wetting layer based on an oxide, especially based on zinc oxide, optionally doped with at least one other element, such as aluminum.

In a most particular variant, the subjacent dielectric film comprises at least one noncrystalline smoothing layer made of a mixed oxide, said smoothing layer being in contact with a crystalline superjacent wetting layer and especially a zinc-oxide-based layer.

Preferably, the underblocker film and/or the overblocker film comprise/comprises a thin layer based on nickel (Ni) or titanium (Ti) having a geometric thickness e such that $0.2 \text{ nm} \leq e \leq 1.8 \text{ nm}$.

In one particular version, at least one thin nickel-based layer, and especially that of the overblocker film, includes chromium (Cr), preferably containing 80% Ni and 20% Cr by weight.

In another particular version, at least one thin nickel-based layer, especially that of the overblocker film, includes titanium, preferably containing 50% Ni and 50% Ti by weight.

The overcoat for the superjacent dielectric film, the one furthest away from the substrate, is preferably based on an oxide, preferably deposited substoichiometrically, and especially based on titanium oxide ($TiO_x$) or based on a mixed tin zinc oxide ($SnZnO_x$) or based on zirconium oxide ($ZrO_x$), optionally doped with another element in an amount of at most 10% by weight.

The thin-layers stack may thus include an overcoat, i.e. a protective layer, preferably deposited substoichiometrically. This overcoat or protective layer is oxidized essentially stoichiometrically in the thin-layers stack after deposition.

Preferably, this protective layer has a thickness of between 0.5 and 10 nm.

In the glazing unit according to the invention, each substrate may be monolithic and may be clear, extra-clear or even tinted.

In the glazing unit according to the invention, at least one substrate may have a laminated structure, especially combining at least two rigid substrates of the glass type with at least one thermoplastic polymer sheet, so as to have a structure of the following type: glass/polymer sheet(s)/glass. The polymer may especially be based on polyvinyl butyral PVB, ethylene/vinyl acetate EVA, polyethylene terephthalate PET and polyvinyl chloride PVC.

The substrates of the glazing unit according to the invention are preferably capable of undergoing a heat treatment without damage to the antireflection film(s) and/or to the insulating film(s).

These substrates are therefore optionally curved and/or tempered.

Advantageously, the present invention thus makes it possible to produce a multiple glazing unit, especially triple glazing, with a favorable attractive appearance very close to that of double glazing ($T_{Lvis} \geq 60\%$, $R_{Lvis} \leq 30\%$, neutral colors in reflection), but with much superior thermal insulation characteristics and a g-value similar to those of comparable double glazing units.

Also advantageously, the multiple glazing unit incorporates, at least on one side, an antireflection film and, on the other side, an insulating film having reflection properties in the infrared and/or in solar radiation which are in a face-to-face relationship with respect to each other, relative to an intermediate gas-filled cavity, and which are thus both protected from external attack. It is therefore unnecessary for these films to be mechanically and chemically resistant.

Moreover, the glazing units according to the invention are easy to manufacture and have advantageous energy characteristics for a low development cost.

In these figures, the proportions of the various elements have not been drawn to scale so as to make them easier to read.

FIG. 1 illustrates the construction of a DGU (double glazing unit) 80 of the prior art having the following configuration: 4-16(Ar 90%)-4, i.e. consisting to two 4 mm transparent glass sheets, each forming a substrate 10, 30, separated by an intermediate gas-filled cavity comprising 15 to 90% argon and 10% air with a thickness of 16 mm, the whole assembly being held together by a frame structure 90.

One of the glass sheets, namely the substrate 30, is coated on its inner face 29 turned toward the intermediate gas-filled cavity with an insulating film 26 consisting of a functional-monolayer coating described below, namely the sheet closest to the inside of the building when considering the incident direction of the solar light entering the building, illustrated by the double-sided arrow, directed in the figure from the left to the right (the functional-monolayer coating is thus on the inner face called "face 3").

This construction constitutes Example 1 below.

Figure 6:
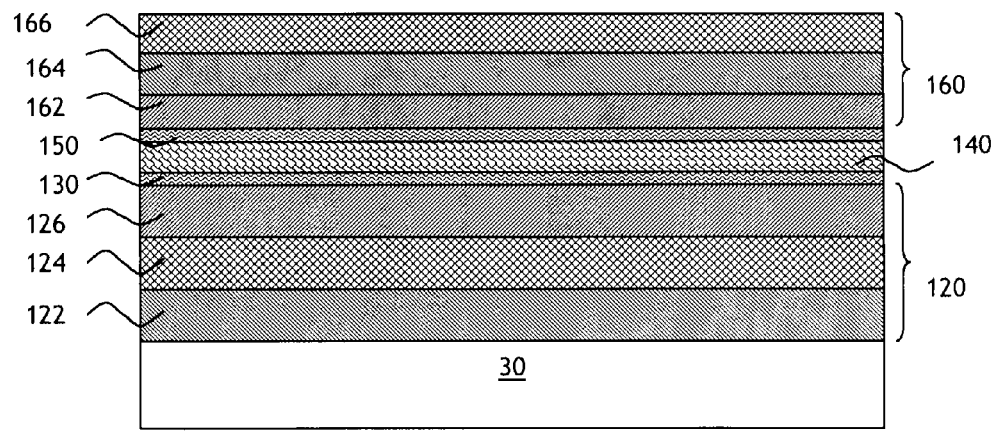
FIG. 6 illustrates an insulating film according to the invention comprising a functional-monolayer coating, the functional monolayer being provided with an underblocker film and with an overblocker film and the coating being furthermore provided with an optional protective film.

FIG. 6 illustrates the structure of the functional-monolayer coating deposited on the glass substrate 30, in which the single functional layer 140 lies between two dielectric films, namely the subjacent dielectric film 120 located beneath the functional layer 140 in the direction of the substrate 30 and the superjacent dielectric film 160 lying above the functional layer 140 on the opposite side from the substrate 30.

These two dielectric films 120, 160 each comprise at least one dielectric layer 122, 124, 126; 162, 164, 166.

Optionally, on the one hand, the functional layer 140 may be deposited on an underblocker film 130 placed between the subjacent dielectric film 120 and the functional layer 140 and, on the other hand, the functional layer 140 may be deposited directly beneath an overblocker film 150 placed between the functional layer 140 and the superjacent dielectric film 160.

FIG. 6 shows that the lower dielectric film 120 comprises three dielectric layers 122, 124 and 126, that the upper dielectric film 160 comprises three dielectric layers 162, 164, 166 and that this dielectric film 160 terminates in an optional protective layer, in particular one based on an oxide, especially an oxide substoichiometric in oxygen.

Table 1 below illustrates the geometric thicknesses (and not the optical thicknesses) in nanometers of each of the layers of the insulating film that has been used for all Examples 2 to 4 below:

TABLE 1

| Layer | Material | |
|---|---|---|
| 166 | $SnZnO_x$:Sb | 2 |
| 164 | $Si_3N_4$:Al | 25 |
| 162 | ZnO:Al | 5 |
| 150 | Ti | 1 |
| 140 | Ag | 10 |
| 126 | ZnO:Al | 5 |
| 124 | $TiO_2$ | 15 |
| 122 | $SnO_2$ | 15 |

The subjacent dielectric film 120 comprises a dielectric layer 122 made of tin oxide $SnO_2$ (index n=2.0) and at least one highly refringent dielectric layer 124 made of titanium oxide $TiO_2$ (index n=2.4), said dielectric layer 124 being in contact with a superjacent dielectric wetting layer 126 which makes it possible to improve the crystallization of the silver, thereby improving its conductivity.

In this thin-layers stack, the wetting layer, just like the dielectric layer 162, is made of aluminum-doped zinc oxide ZnO:Al (index n=1.9) deposited from a metal target consisting of zinc doped with 2% aluminum by weight.

The dielectric layer 164 is made of silicon nitride $Si_3N_4$ doped with 8% aluminum by weight (index n=2.0).

The dielectric layer 166 is a terminal protective layer, which here is made of an antimony-doped mixed tin zinc oxide (index n=2.0) this layer having been deposited from a metal target having 65/34/1 mass ratios for Zn/Sn/Sb respectively.

It may be seen that the optical thickness of the subjacent dielectric film 120 is:

$$15 \times 2 + 15 \times 2.4 + 5 \times 1.9 = 75.5 \text{ nm}$$

and that the optical thickness of the superjacent dielectric film 160 is:

$$5 \times 1.9 + 25 \times 2 + 2 \times 2 = 63.5$$

i.e. an optical thickness ratio $e_{120}/e_{160}$ of 1.19.

Triple glazing units (TGUs) were constructed on this basis.

Figure 2:
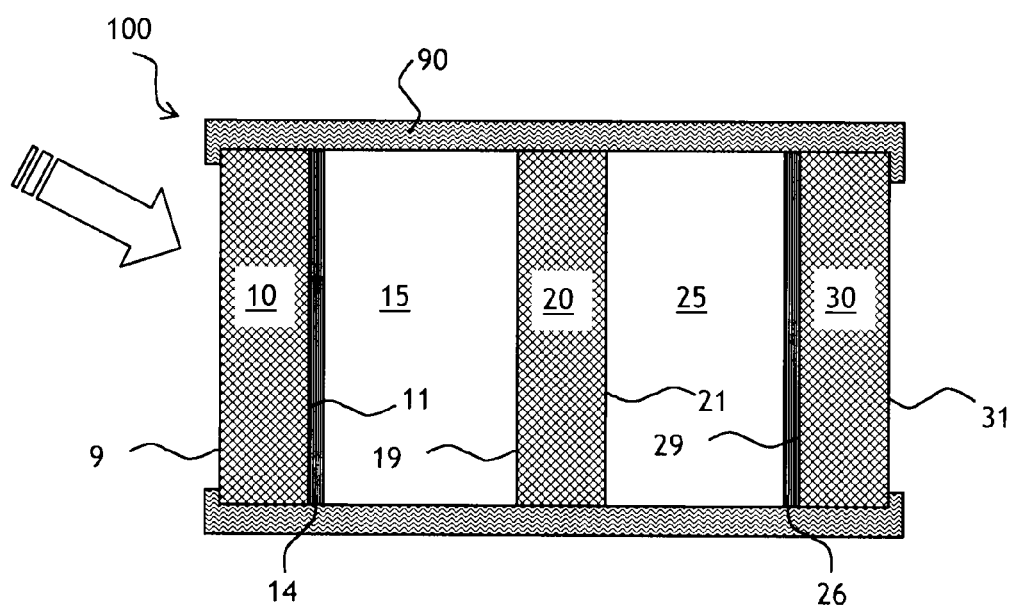
FIG. 2 illustrates a cross-sectional view of a triple glazing unit according to Example 2.

An example 2 of multiple glazing 100 consisting of a triple glazing unit was constructed. This glazing unit, illustrated in FIG. 2, has the following configuration: 4-12 (Ar 90%)-4-12 (Ar 90%)-4, i.e. it consists of three 4 mm transparent glass sheets, each forming a substrate 10, 20, 30, separated in pairs by an intermediate gas-layer 15, 25 containing 90% argon and 10% air each with a thickness of 12 mm, the whole assembly being held together by a frame structure 90.

The outer two substrates 10, 30 of this triple glazing unit are each coated, on its inner face 11, 29 turned toward the intermediate gas-filled cavity 15, 25, with an insulating film 14, 26 formed from the functional-monolayer coating described above—the functional-monolayer coatings are thus on faces called "face 2" and "face 5".

The central substrate 20 of this triple glazing unit, namely the one whose two faces 19, 21 are in contact with the intermediate gas-filled cavities 15 and 25 respectively, is not coated with any film on either of these faces.

This Example 2 makes it possible to obtain better thermal insulation than that of the double glazing unit of Example 1, as manifested by a lower U-value, but the light transmission of the glazing is lower than that of the double glazing of Example 1 and its g-value is also lower.

Figure 3:
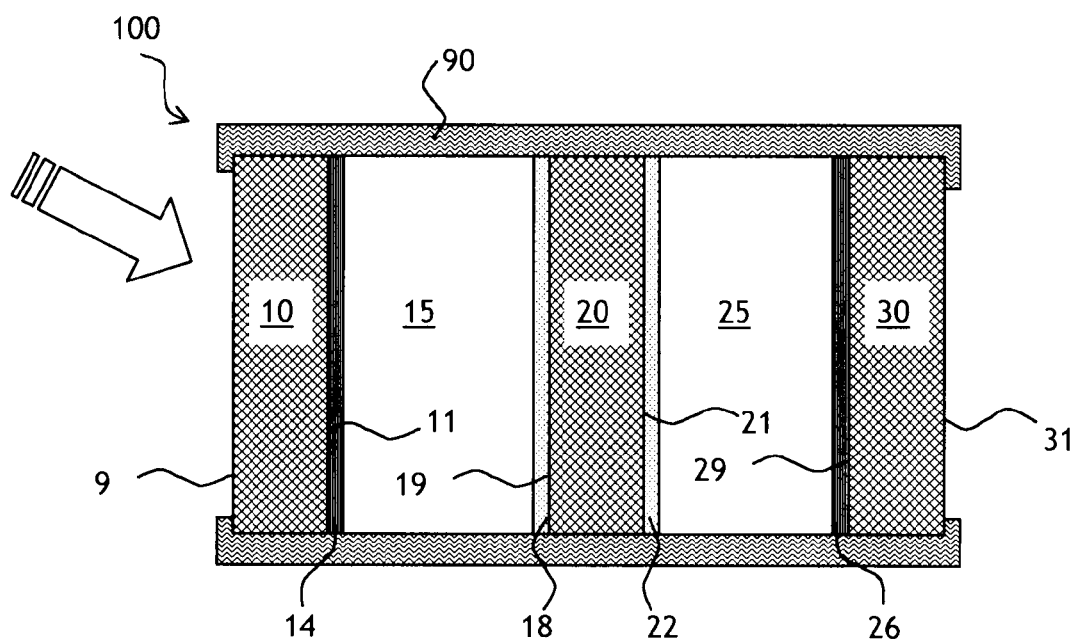
FIG. 3 illustrates a cross-sectional view of a triple glazing unit according to the invention, namely Example 3.

To remedy this problem, an Example 3 of triple glazing, illustrated in FIG. 3, was constructed according to the invention. This triple glazing unit has the same multiple glazing unit configuration as Example 2: 4-12 (Ar 90%)-4-12 (Ar 90%)-4, i.e. it consists of three 4 mm transparent glass sheets, each forming a substrate 10, 20, 30, separated pairwise by an intermediate gas-filled cavity 15, 25 containing 90% argon and 10% air each with a thickness of 12 mm, the whole assembly being held together by a frame structure 90.

As in the case of Example 2, the outer two substrates 10, 30 of this triple glazing unit are each coated, on its inner face 11, 29 turned toward the intermediate gas-filled cavity 15, 25, with an insulating film 14, 26 consisting of the functional-monolayer coating described above—the functional-monolayer coatings are thus on the faces called "face 2" and "face 5".

However, within the context of Example 3, the two faces 19, 21 of the central substrate 20 of this triple glazing unit, which are in contact with the intermediate gas-filled cavities 15 and 25 respectively, are each coated with an antireflection film 18, 22.

This Example 3 makes it possible to obtain thermal insulation as good as that of Example 2, as manifested by an identical U-value, but the light transmission of the glazing is higher than that of the triple glazing of Example 2 and its g-value is also higher. It is therefore possible to obtain a light transmission and a g-value that are substantially identical to those of the double glazing unit of Example 1.

Figure 4:
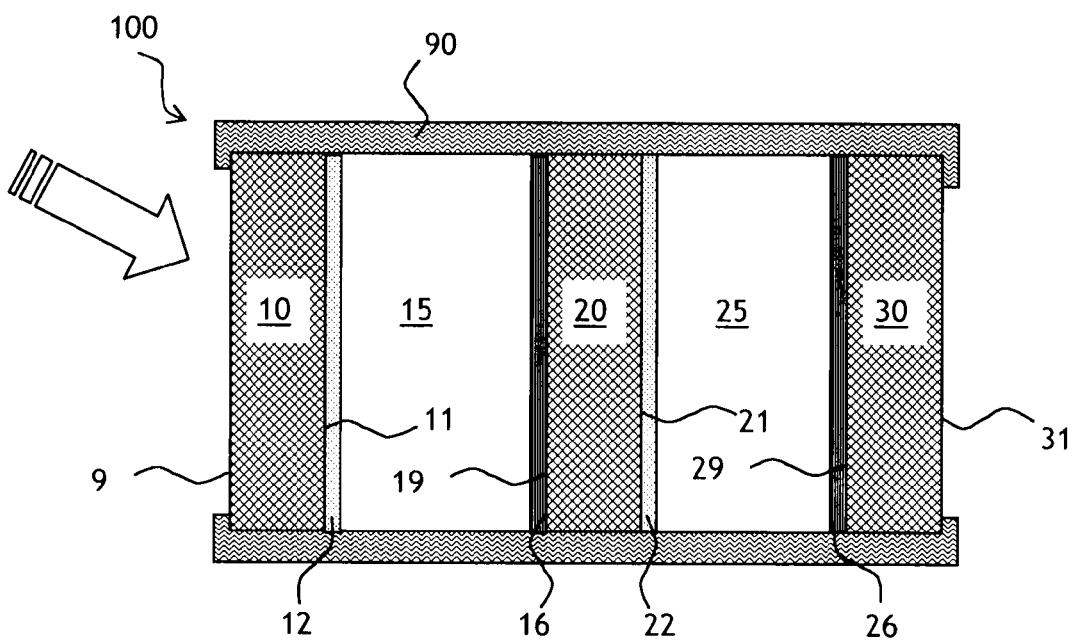
FIG. 4 illustrates a cross-sectional view of another triple glazing unit according to the invention, namely Example 4.

Another example of triple glazing, namely Example 4, illustrated in FIG. 4, was constructed according to the invention. This triple glazing unit has the same configuration as Examples 2 and 3, namely 4-12 (Ar 90%)-4-12 (Ar 90%)-4, i.e. it consists of three 4 mm transparent glass sheets, each forming a substrate 10, 20, 30, separated pairwise by an intermediate gas-filled cavity 15, 25 containing 90% argon and 10% air each with a thickness of 12 mm, the whole assembly being held together by a frame structure 90.

However, within the context of Example 4, the substrates 20, 30 of this triple glazing unit are each coated, on its inner face 19, 29 turned toward the intermediate gas-filled cavity 15, 25, with an insulating film 16, 26 consisting of the functional-monolayer coating described above—the functional-monolayer coatings are thus on faces called "face 3" and "face 5". Moreover, the two faces 11, 21 of the substrates 10, 20 of this triple glazing unit, which are in contact with the intermediate gas-filled cavities 15 and 25 respectively, are each coated with an antireflection film 12, 22.

This Example 4 makes it possible to obtain thermal insulation as good as that of Example 3, as manifested by an identical U-value and a light transmission as high as that of the triple glazing unit of Example 3, but with an even higher g-value than that of Example 3.

In the examples according to the invention, the antireflection film 12, 18, 22 consists of a thin-layers stack comprising four thin layers with the following structure:

substrate/$Si_3N_4$/$SiO_2$/$Si_3N_4$/$SiO_2$.

This film thus has, starting from the substrate, in succession: a high-index layer, a low-index layer, a high-index layer and a low-index layer.

The above film was produced according to the teaching of international patent application WO 2007/104874.

However, such a thin-film coating may be replaced with any equivalent antireflection film, especially any antireflection film based on a porous layer, such as for example those known from the teaching of international patent application WO 2008/059170.

Such a thin-film coating may also be replaced by any equivalent antireflection film consisting of a treatment of the glass surface by etching, as for example known from U.S. Pat. No. 2,490,662. It is thus possible to create a skeletonized silicate structure having a refractive index between 1.0 and 1.3 over a thickness of around 50 to 200 nm, and preferably 60 to 150 nm, on the surface of the substrate.

Table 2 below illustrates in summary the main characteristics of Examples 1 to 4:

TABLE 2

| Layer | Ex. 1 | Ex. 2 | Ex. 3 | Ex. 4 |
|---|---|---|---|---|
| $T_{Lvis}$ (%) | 80 | 74 | 79 | 79 |
| $R_{Lvis}$ (%) | 12 | 15 | 10 | 10 |
| g-value | 0.63 | 0.6 | 0.62 | 0.66 |
| U-value | 1.1 | 0.7 | 0.7 | 0.7 |

In the above table, the optical and energy characteristics presented are:

$T_{Lvis}$, the light transmission $T_L$ in the visible in % measured under illuminant $D_{65}$;

$R_{Lvis}$, the light reflection $R_L$ in the visible in % measured under illuminant $D_{65}$;

the g-value; and the U-value in $W \cdot m^{-2} \cdot K^{-1}$.

As is usual, throughout the present document:

the g-value denotes the solar factor, i.e. the ratio of the total energy entering a location through the glazing to the total incident solar energy. This ratio, calculated according to the EN 410 standard, is therefore between 0 and 1;

the U-value, also sometimes called the "K factor" denotes the coefficient of thermal transmission through the glazing. It denotes the amount of heat passing through the wall, in the steady state, per unit area and for a unit temperature difference between the atmospheres located on either side of the glazing, without taking into account the effects of the edges of the frame structure. It is generally, as is the case here, calculated according to the EN 673 standard and is expressed in $W \cdot m^{-2} \cdot K^{-1}$.

It should be noted that, in the case of Examples 2, 3 and 4, the substrates 10, 20, 30 are made of extra-clear glass sold by Saint-Gobain under the brand name DIAMANT.

Similar examples, numbered 2', 3' and 4', were constructed using standard glass substrates 10, 20, 30 sold by Saint-Gobain under the brand name PLANILUX.

These substrates make it possible to obtain the characteristics summarized in Table 3 below:

TABLE 3

| Layer | Ex. 2' | Ex. 3' | Ex. 4' |
|---|---|---|---|
| $T_{Lvis}$ (%) | 70 | 75 | 75 |
| $R_{Lvis}$ (%) | 14 | 9 | 9 |
| g-value | 0.55 | 0.57 | 0.60 |
| U-value | 0.7 | 0.7 | 0.7 |

Furthermore, it has been found that the g-value and the light transmission could each be increased by at least 1% and in general by about 2% by adding an antireflection film on an outer face of the triple glazing unit, i.e. on face 1 or on face 6, and that the g-value and the light transmission could each be increased by at least 2% and in general by about 4% by adding an antireflection film on the two outer faces of the triple glazing unit, i.e. on face 1 and on face 6.

Three other examples, numbered 5, 6 and 7, were constructed on the basis of Examples 1 to 3 respectively, by producing the insulating film 14 in the form of an electrochromic element, i.e. by substituting the monolithic substrate 10 with a laminated substrate, incorporating an active system of the simple (non-redundant) electrochromic system type, according to the teaching of patent applications EP 867 752 and EP 831 360.

Table 4 below illustrates in summary the main characteristics of Examples 5 to 7 when the electrochromic system is not active:

TABLE 4

| Layer | Ex. 5 | Ex. 6 | Ex. 7 |
|---|---|---|---|
| $T_{Lvis}$ (%) | 59 | 52 | 55 |
| $R_{Lvis}$ (%) | 12 | 14 | 12 |
| g-value | 0.4 | 0.4 | 0.4 |
| U-value | 1.3 | 1 | 1 |

Within the context of this series of examples too, the triple glazing unit solution of Example 7, which is according to the invention, makes it possible to obtain thermal insulation as good as that of the triple glazing unit of Example 6, which is not according to the invention, as manifested by a substantially identical U-value, but the light transmission of the triple glazing unit of Example 7 is higher than that of the triple glazing unit of Example 6 and its g-value is also the same: it is therefore possible to obtain a light transmission and a g-value that are substantially identical to those of the double glazing unit of Example 5.

The use of an antireflection film in a triple glazing unit incorporating an active system of the electrochromic system type thus makes it possible to maintain a high level of transparency (light transmission in the visible) in the bleached state and to obtain a high g-value in the bleached state, which may be very useful in the case of curtain wall glazing for buildings.

Within the context of the invention, the active systems are in general electrochemical systems, and more particularly electrically controllable systems of the type having variable energy and/or optical properties.

The electrically controllable systems make it possible, in particular, to obtain glazing in which it is possible to modify, at will, the darkening/the degree of vision or degree of filtration of thermal/solar radiation. Glazing may for example be viologen-based glazing for adjusting the light transmission or absorption, as described in U.S. Pat. No. 5,239,406.

There are also what are called "optical valve" systems, comprising polymer-based films dispersed within which are microdroplets containing particles capable of moving in a preferential direction under the action of an electric field. An example of this is described in international patent application WO 93/09460.

There are also liquid-crystal systems, with an operating mode similar to the ones above. They use a polymer film placed between two conducting layers and, dispersed within said film, droplets of liquid crystals, especially nematic liquid crystals having a positive dielectric anisotropy. When the film is under voltage, the liquid crystals are oriented along a preferential axis, thereby permitting vision. When not under voltage, the film becomes scattering. Examples of this are described in the patents EP-88 126, EP-268 877, EP-238 164, EP-357 234, EP-409 442 and EP-964 288. Mention may also be made of cholesteric liquid-crystal polymers, such as those described in the patent WO 92/19695 and liquid-crystal systems that switch with a variation in light transmission $T_L$.

There is also electrochromic glazing which enables the light and thermal transmission to be modulated. Such glazing is described in particular in patents EP-253 713 and EP-670 346, the electrolyte being in the form of a polymer or a gel and the other layers being of mineral type. Another type of glazing is described in patent applications EP-867 752, EP-831 360, WO 00/57243 and WO 00/03289, the electrolyte being this time in the form of an essentially mineral layer, all of the layers of the system then being essentially mineral: this type of electrochromic system is commonly referred to as an "all-solid-state" electrochromic system. There are also electrochromic systems in which all the layers are of the polymer type, in which case they are referred to as "all-polymer" electrochromic systems.

In general, electrochromic systems comprise two layers of electrochromic material separated by an electrolyte layer and flanked by two electroconductive layers.

Any active system is supported by a substrate, which may be a substrate 10, 20, 30. It may also be associated, without an intermediate gas-filled cavity, with at least one other substrate, or even several other substrates, whether made of mineral or plastic materials. In this case, in the absence of an intermediate gas-filled cavity, the whole assembly of the system is considered as forming an insulating film within the meaning of the invention.

Within the context of the present invention and throughout the present text, the term "layer" should be taken in its widest sense. It may just as well be made of mineral materials as organic materials, most particularly polymers, which may take the form of polymer films or even of gel films. It may be what is called a hybrid active system, namely combining mineral and inorganic materials with organic or polymer materials.

It is also possible to envision triple glazing structures of the substrate 10/SA1/cavity 15/substrate 20/cavity 25/SA2/substrate 30 type, in which SA1 and SA2 denote two identical active systems or two different active systems, or even two mutually coupled active systems.

Examples of active systems suitable within the context of the invention may also be found in the patent applications EP 240 226 and EP 1 775 625.

Figure 5:
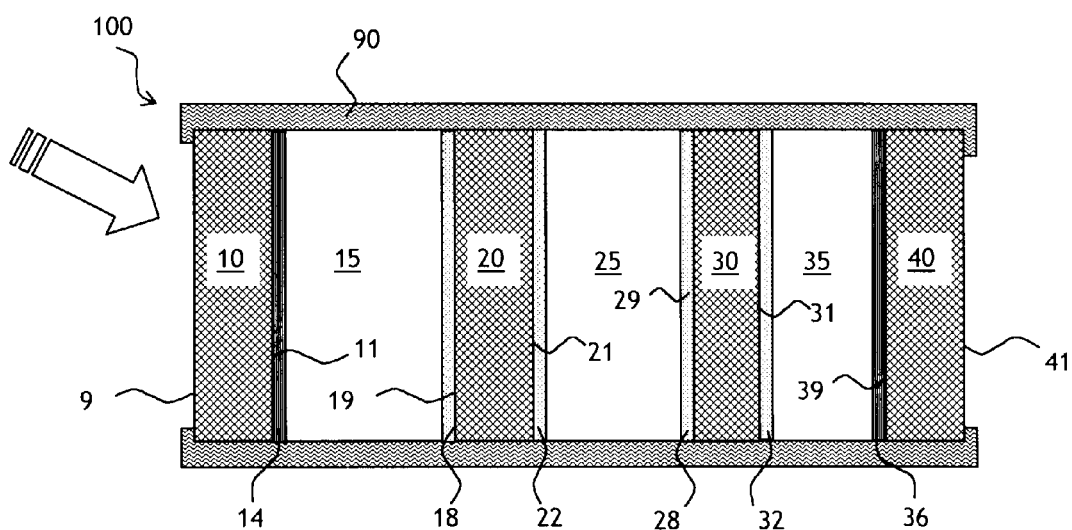
FIG. 5 illustrates a cross-sectional view of a quadruple glazing unit according to the invention.

FIG. 5 illustrates an example of quadruple glazing according to the invention. This quadruple glazing unit has the following configuration: 4-12 (Ar 90%)-4-12 (Ar 90%)-4-12 (Ar 90%)-4, i.e. it consists of four 4 mm transparent glass sheets, each forming a substrate 10, 20, 30, 40 separated pairwise by an intermediate gas-filled cavity 15, 25, 35 containing 90% argon and 10% air each with a thickness of 12 mm, the whole assembly being held together by a frame structure 90.

As in the case of Example 2, the two outer substrates 10, 40 of this quadruple glazing unit are each coated, on its inner face 11, 39 turned toward the intermediate gas-filled cavity 15, 35, with an insulating film 14, 36 consisting of the functional-monolayer coating described above. The functional-monolayer coatings are thus on the faces called "face 2" and "face 7".

Within the context of this quadruple glazing unit, the four faces 19, 21, 29, 31 of the two central substrates 20, 30, which are in contact with the intermediate gas-filled cavities 15, 25 and 35 respectively, are each coated with an antireflection film 18, 22, 28, 32.

This quadruple glazing unit makes it possible to obtain even better thermal insulation than that of Example 3 and even Example 4, with a light transmission and a g-value that are substantially the same as those of these Examples 3 and 4.

The present invention has been described above by way of example. It should be understood that a person skilled in the art is capable of producing different variants of the invention without thereby departing from the scope of the patent as defined by the claims.

The invention claimed is:
1. A multiple glazing unit, comprising:
a first substrate;
a second substrate; and
a third substrate,
each substrate having at least two faces,
which are held together by a frame structure, in which at least two intermediate gas-filled cavities each lie between two of the substrates,
wherein at least one of the substrates comprises, on at least one face in contact with an intermediate gas-filled cavity, an antireflection film which is in a face-to-face relationship, relative to said intermediate gas-filled cavity, with an insulating film having reflection properties for at last one of infrared and solar radiation,
wherein the insulating film comprises a low-E or solar-control thin-layers stack, and the thin-layers stack comprises at least one functional layer having a reflection property for the at least one of infrared and solar radiation,
the thin-layers stack comprises a single metallic functional layer between two dielectric films
the metallic functional layer comprises silver or a silver-comprising metal alloy,
the two dielectric films each comprise a dielectric layer,
an optical thickness $e_{120}$ of the dielectric film subjacent to the functional layer is greater than the optical thickness $e_{160}$ of the dielectric film superjacent to the functional layer,
a ratio of the optical thickness $e_{120}$ of the subjacent dielectric film to an optical thickness $e_{160}$ of the superjacent dielectric film, $e_{120}/e_{160}$, is from 1.05 and 1.4, including these values.

2. The multiple glazing unit of claim 1, wherein for a central substrate amongst the substrates, the two faces are each in contact with an intermediate gas-filled cavity, and the central substrate has an antireflection film on at least one face in contact with an intermediate gas-filled cavity.

3. The multiple glazing unit of claim 1, wherein, in a face-to-face relationship relative to all the intermediate gas-filled cavities, one face of one of the substrates has an antireflection film and the other face of the other substrate in the face-to-face relationship, has an insulating film having a reflection for at least one of infrared and solar radiation.

4. The multiple glazing unit of claim 1,
the functional layer is deposited directly on an underblocker film placed between the functional layer and the dielectric film subjacent to the functional layer, and/or
wherein the functional layer is deposited directly beneath an overblocker film placed between the functional layer and the dielectric film superjacent to the functional layer.

5. The multiple glazing unit of claim 1, wherein the dielectric film subjacent to the functional layer comprises a highly refringent dielectric layer, and the highly refringent layer has an optical index greater than 2.2.

6. A method of producing the multiple glazing unit of claim 1 comprising applying the antireflective film onto at least one face of at least one of the substrates.

7. The method of claim 6, wherein the at least one face to which the antireflection film is applied is at least one of the faces of the central substrate of the multiple glazing unit, and the at least one face is in contact with an intermediate gas-filled cavity.

8. The method of claim 6, wherein, in a face-to-face relationship relative to all intermediate gas-filled cavities, one face of one substrate comprising an antireflection film and the other face of the other substrate comprises an insulating film with a reflection property for at least one of infrared and solar radiation.

9. The multiple glazing unit of claim 2, wherein the central substrate has an antireflection film on both faces in contact with an intermediate gas-filled cavity.

10. The multiple glazing unit of claim 1, wherein the insulating film comprises at least one active system of the electrochromic system type.

11. The multiple glazing unit of claim 4, wherein the functional layer is deposited directly beneath the overblocker film placed between the functional layer and the dielectric film superjacent to the functional layer.

12. The multiple glazing unit of claim 1, wherein the ratio, $e_{120}/e_{160}$, of from 1.08 and 1.3, including these values.

13. The multiple glazing unit of claim 5, wherein the highly refringent layer has an optical index of from 2.3 and 2.8 including these values.

14. The multiple glazing unit of claim 5, wherein the highly refringent layer has an optical index of from 2.4 and 2.7 including these values.

15. The multiple glazing unit of claim 2, wherein, in a face-to-face relationship relative to all the intermediate gas-filled cavities, one face of one of the substrates has an antireflection film and the other face of the other substrate in the face-to-face relationship, has an insulating film having a reflection for at least one of infrared and solar radiation.

16. The multiple glazing unit of claim 2, wherein, in a face-to-face relationship relative to all the intermediate gas-filled cavities, one face of two of the substrates has an antireflection film and the other face of the other substrate in the face-to-face relationship, has an insulating film having a reflection for at least one of infrared and solar radiation.

17. The multiple glazing unit of claim 1, wherein a light transmission in the visible range is at least 55%.

18. The multiple glazing unit of claim 17, wherein the light transmission is at least 60%.

19. The multiple glazing unit of claim 18, wherein a light reflection in the visible range is at most 30%, a g-value is at least 0.6, and a U-value is at most 1.5.

* * * * *